United States Patent [19]

Sakamoto

[11] Patent Number: 5,028,957
[45] Date of Patent: Jul. 2, 1991

[54] IMAGE FORMING APPARATUS WITH AN IMAGE READING FUNCTION

[75] Inventor: Masashi Sakamoto, Osaka, Japan

[73] Assignee: Minolta Camera Kabushiki Kaisha, Osaka, Japan

[21] Appl. No.: 443,180

[22] Filed: Nov. 30, 1989

[30] Foreign Application Priority Data

Dec. 1, 1988 [JP] Japan ............... 63-305627

[51] Int. Cl.⁵ ............................ G03G 21/00
[52] U.S. Cl. .................... 355/202; 355/321; 346/160
[58] Field of Search ........... 355/308, 309, 202, 200, 355/321, 325; 346/160

[56] References Cited

U.S. PATENT DOCUMENTS

| | | | |
|---|---|---|---|
| 4,046,471 | 9/1977 | Branham et al. | 355/202 |
| 4,180,318 | 12/1979 | Matsumoto et al. | |
| 4,298,279 | 11/1981 | Yoshimura et al. | 355/321 X |
| 4,300,757 | 11/1981 | Koiso et al. | 355/321 X |
| 4,496,984 | 1/1985 | Stoffel | 358/497 |
| 4,583,126 | 4/1986 | Stoffel | 358/401 |
| 4,696,562 | 9/1987 | Urata et al. | 355/202 |
| 4,727,387 | 2/1988 | Israely | 346/160 |
| 4,731,673 | 3/1988 | Yamakawa | 346/160 X |

FOREIGN PATENT DOCUMENTS

63-163376  7/1988  Japan .

Primary Examiner—A. T. Grimley
Assistant Examiner—Sandra L. Hoffman
Attorney, Agent, or Firm—Burns, Doane, Swecker & Mathis

[57] ABSTRACT

An image forming apparatus provided with an image reading unit for reading an image of an original fed into an original path, wherein the original path is confluent with a first copy sheet path connecting an image forming unit with a common tray. The image reading unit is detachable from the body of the apparatus. A copy sheet is formed an image on a first side and ejected to the common tray with the first side down. An original inserted into the original path is ejected to the common tray with its first side having an image up. Further, the apparatus has a second copy sheet path diverging from the first copy sheet path at an upstream of the original path and a sub-tray for receiving a copy sheet ejected from the second copy sheet path, and a switch member is disposed at the diverging point.

21 Claims, 6 Drawing Sheets

IMAGE FORMING APPARATUS WITH AN IMAGE READING FUNCTION

BACKGROUND OF THE INVENTION

1. Field of the Invention

The present invention relates to an image forming apparatus, and more particularly to an image forming apparatus such as a printer which forms an image on a sheet by means of a laser beam according to an electrophotographic method.

2. Description of Related Art

Generally, in an electrophotographic printer, an image data output from a computer of a host system is edited in a bit map memory, and then an electrostatic latent image is formed on a photosensitive member by means of a modulated laser beam to be transferred onto a sheet after being developed with toner. The image to be formed can also be input by using an image sensor such as a CCD (Charge Coupled Device) other than the method with the host computer. However, the method with the image sensor problematically necessitates an image reader.

For the above reasons, Japanese Patent Laid Open Publication No. 63-16337 discloses a printer which includes an image reading section in the sheet transport path of the printer to read the image of an original that has been transported through the sheet transport path. However, when an original is transported through the path as in the above printer, the original is compelled to pass through the toner image transfer section and image fixing section, which possibly causes blurring or damage of the original due to the toner or the heat of the image fixing section.

SUMMARY OF THE INVENTION

Accordingly, it is an object of the present invention to provide an image forming apparatus which operates as an image reader and protects any original to be scanned from being damaged by the toner or the heat.

In order to attain the object above, an image forming apparatus according to the present invention comprises a copy sheet path connecting a copy sheet supplying section with a common receiving section; means disposed at an image forming section for forming an image on the copy sheet which is traveling toward the common receiving section along the copy sheet path; an original insertion port from which an original is inserted; an original path connecting the original insertion port with the copy sheet path; and means for reading an image of the original inserted from the original insertion port, and the junction of the original path and the copy sheet path is located between the image forming section and the common receiving section. In the apparatus, the original whose image was read by the image reading means is transported through the copy sheet path and then ejected to the common receiving section. The image forming means comprises a photosensitive member, a device for forming an electrostatic latent image on the photosensitive member, a device for developing the electrostatic latent image into a toner image, a device for transferring the toner image onto a copy sheet and a device for fixing the transferred toner image on the copy sheet, and the transferring device and the fixing device are disposed along the copy sheet path in order. Preferably, the junction of the original path and the copy sheet path is located a downstream of the fixing device. With the arrangement, the original never passes through the transferring device and the fixing device, so that the original will not be damaged by the toner or the heat.

In the image forming apparatus according to the present invention, the image reading means has an image reading element and an ejection roller for ejecting the original whose image was read by the image reading element to the common receiving section. The ejection roller ensures the smooth original ejection. Preferably, the image reading means is detachable from the body of the apparatus, and a tray for holding an original is provided at the original insertion port.

Further, in the image forming apparatus according to the present invention, the copy sheet fed from the copy sheet supplying section into the copy sheet path is formed an image on a first side, and then it is ejected to the common receiving section with the first side down. On the other hand, the original inserted from the original insertion port is ejected to the common receiving section with a first side having an image up. Accordingly, in the common receiving section, the copy and the original can be distinguished easily.

The image forming apparatus according to the present invention further comprises a second copy sheet path diverging from the copy sheet path at an upstream of the junction with the original path, and a second receiving section for receiving a copy sheet ejected from the second copy sheet path. At the diverging point, switch means for guiding a copy sheet selectively into the copy sheet path or the second copy sheet path is disposed.

In an image forming apparatus according to the present invention, a method comprises the steps of: forming an image on a first side of a sheet; ejecting the sheet to a common tray with the first side down; reading an image on a first side of an original; and ejecting the original whose image was read to the common tray with the first side up. Further, the method comprises the step of storing image data read by the image reading means in a memory, and the image data stored in the memory is reproduced on a copy sheet as a toner image.

BRIEF DESCRIPTION OF THE DRAWINGS

These and other objects and features of the present invention will become apparent from the following description taken in conjunction with the preferred embodiments thereof with reference to the accompanying drawings.

DETAILED DESCRIPTION OF THE PREFERRED EMBODIMENTS

An image forming apparatus according to the present invention is hereinafter described in reference to the accompanying drawings. Further, the same parts and members in the drawings are numbered the same.

Figure 1:
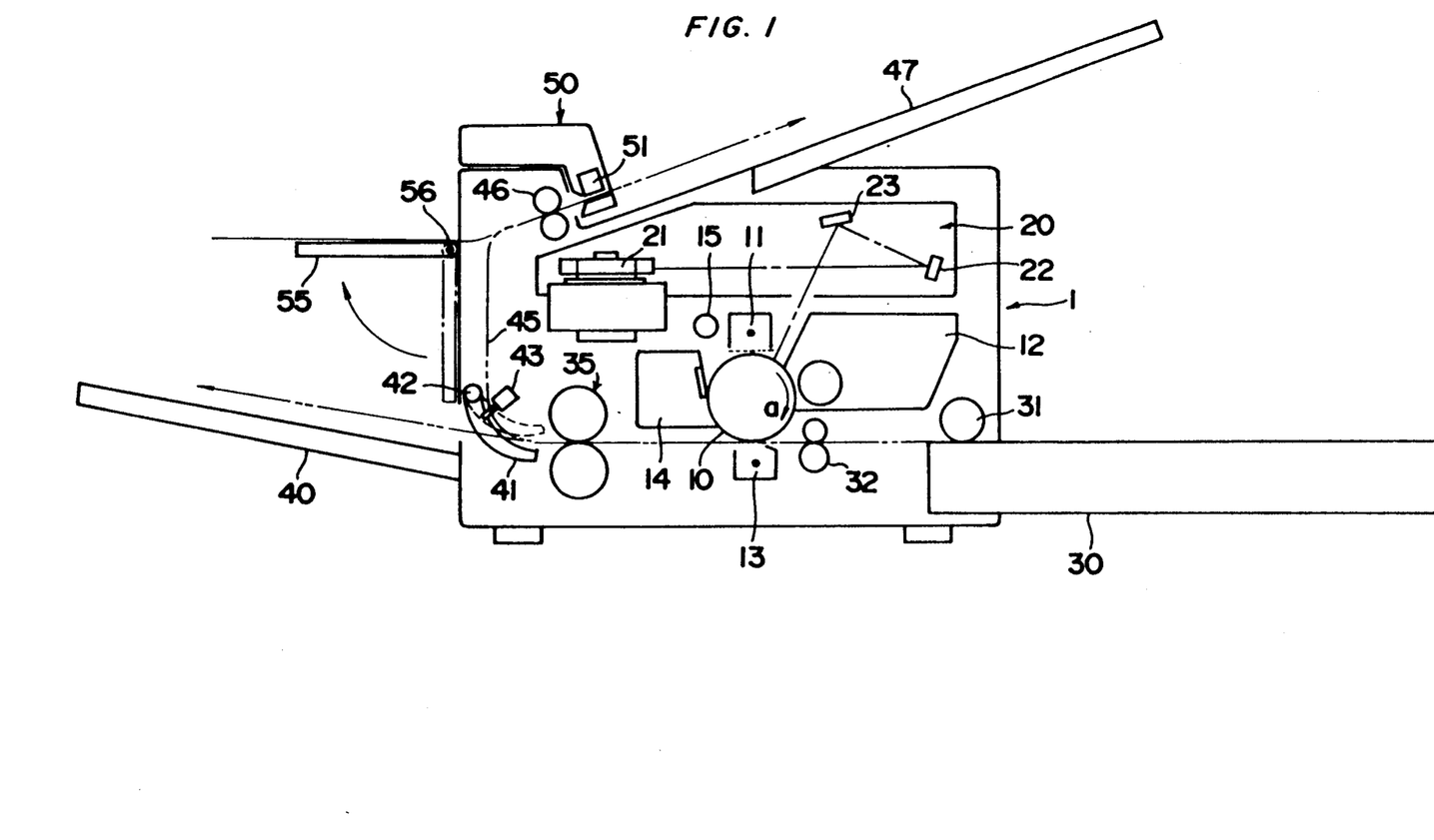
FIG. 1 is a schematic view showing an internal whole constitution of a printer which is a first embodiment according to the present invention.
Figure 2:
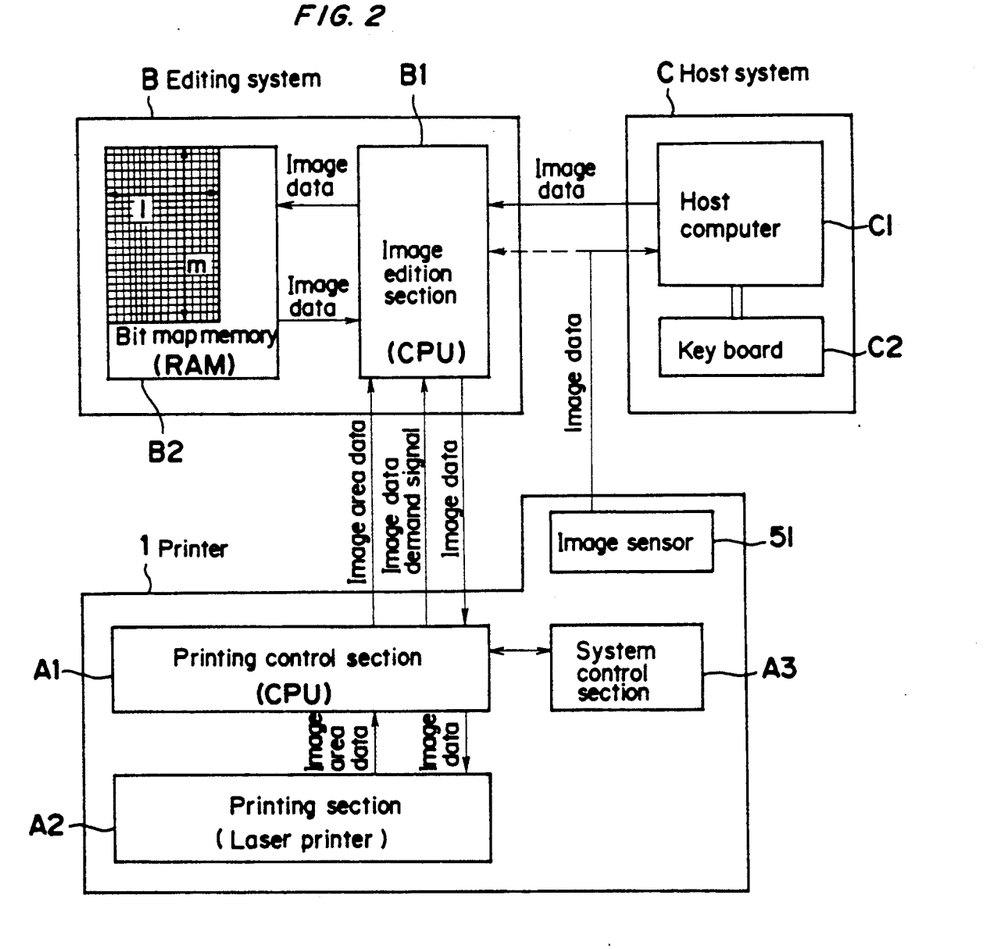
FIG. 2 is a block diagram showing a data processing system including the printer.

[First Embodiment, Refer to FIGS. 1 and 2]

A first embodiment according to the present invention is applied to a small-size laser printer. The printer 1 is provided with a photosensitive drum 10 which is rotatable in the direction of the arrow (a) at the aPProximate center position. Around the photosensitive drum 10, well-known image forming elements such as an electric charger 11, a developing device 12 taking a magnetic brush way, a transfer charger 13, a cleaning device 14 with a blade, and an eraser lamp 15 are arranged. The photosensitive drum 10 is electrically charged evenly over the entire surface by rotating under the electric charger 11, and then an electrostatic latent image is formed on the drum 10 by the exposure operation of a laser beam optical system 20. The electrostatic latent image is further developed with toner by the operation of the developing device 12.

The laser beam optical system 20 has known constituent parts such as a semiconductor laser operating as a light source (not shown), a lens system composed of such a lens as a collimator lens (not shown), a polygon mirror 21, image reflection mirrors 22 and 23, etc.

On the other hand, sheets are loaded in an automatic sheet feed cassette 30 to be fed one by one toward an image transfer section in accordance with the rotation of a sheet feed roller 31. The sheet fed out of the cassette 30 is once stopped by a pair of timing rollers 32, and then transported into the image transfer section in synchronization with the image on the photosensitive drum 10 to receive a toner image. After the image transfer, the drum 10 continues to rotate in the direction of the arrow (a) to remove the remaining toner by the operation of the cleaning device 14 and erase remaining charge by the operation of the eraser lamp 15 for the next image forming operation.

The sheet onto which a toner image has been transferred is subjected to heat by an image fixing device 35 for the fixation of the toner, and then ejected from the printer 1 either in a face-up ejection mode or in a face-down ejection mode. In the face-up ejection mode, the sheet is ejected straight onto a tray 40 with the printed surface upside. In the face-down ejection mode, the sheet is ejected by the operation of a pair of ejection rollers 46 onto a tray 47 through a reverse ejection path 45 provided along the internal wall of the printer 1 with the printed surface downside. In order to switch over the sheet ejection path, a sheet diverter 41 is provided at the exit of the fixing device 35. The sheet diverter 41 is pivotally supported at a pin 42 as being driven by a solenoid 43. The sheet diverter 41 is held in a position as illustrated by the solid line in FIG. 1 to guide the sheet toward the reverse ejection path 45, when the solenoid 43 is turned off. When the solenoid 43 is turned on, the sheet diverter 41 is put in a position as illustrated by the dotted line in FIG. 1 to guide the sheet onto the face-up tray 40. Ordinarily, the sheet is ejected onto the tray 47 in the face-down ejection mode to be subjected to a paging process. Small-sized cards such as post cards, name cards, and any thick cards are ejected onto the tray 40 in the face-up ejection mode.

In the first embodiment, the printer 1 further comprises an image sensor 51 at the exit of the reverse ejection path 45 and an original insertion shelf 55 on the side of the printer 1. The image sensor 51 is a contact type line sensor employing a CCD (Charge Coupled Device), and integrated in an image reading unit 50. The unit 50 is prepared as an optional part of the printer 1. The original insertion shelf 55 is pivoted on a pin 56, and ordinarily hung alongside the printer 1 in a position as illustrated by the chain line. The original insertion shelf 55 can be set in a position as illustrated by the solid line 55 by being brought up to the horizontal posture at the time of inserting an original. An original is inserted into the hind portion of the reverse ejection path 45 from the original insertion shelf 55 with the printed surface upside by an operator, and then transported into the unit 50 by means of the ejection rollers 46. The original is then subjected to an image scanning process by the image sensor 51 to be ejected onto the tray 47. It is noted in the above operation that the inserted originals are ejected with the image surface upside while copies are ejected with the printed surfaces downside on the tray 47. Therefore, when any copies are mixed with the originals, it is easy to discriminate the originals. The insertion of any original is detected by a sensor (not shown) disposed immediately before the image sensor 51, and the sensor 51 starts the scanning operation in response to the detection signal from the sensor.

The following describes a data processing system including the printer 1 with reference to FIG. 2.

A control system of the printer 1 comprises a printing control section A1 including a CPU, a printing section A2 including the photosensitive drum 10, a system control section A3 for controlling the sheet ejection mode, image density, etc., and the image sensor 51. An editing system B comprises an image edition control section B1 including a CPU, and a bit map memory B2 including a RAM. A host system C comprises a host computer C1 functioning as a word processor or the like, and a key board C2.

Ordinarily, image data is transmitted from the host computer C1 to the edition control section B1, and an image area is allotted in the bit map memory B2. The edited image data is transmitted from the image edition control section B1 to the printing control section A1 of the printer 1, and an image is formed on a sheet by operating the printing section A2. An image data demand signal and an image area data (1) and (m) are transmitted from the printing control section A1 to the image edition control section B1.

In the meantime, the original image data read by the image sensor 51 is transmitted to the host comPuter C1 to be stored therein, and then subjected to the printing operation by the printer 1 as being not processed or after being subjected to an arbitrary process. The printing operation on a sheet can also be performed concurrently with the input of the image data from the image sensor 51. In this case, the sheet diverter 41 is moved to the dotted position as illustrated in FIG. 1 to eject the sheet onto the face-up tray 40. In other words, the printer 1 has the same function as that of a copying machine.

Figure 3:
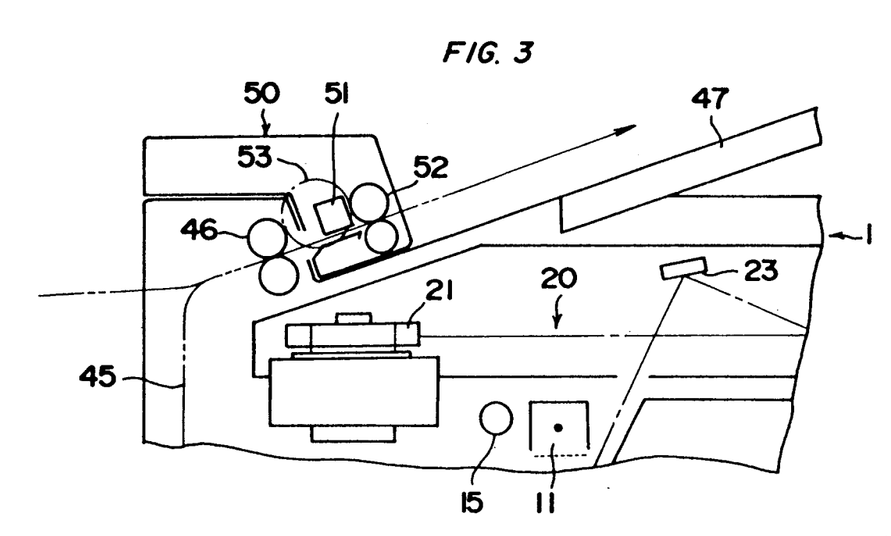
FIG. 3 is a schematic view showing an internal whole constitution of a printer which is a second embodiment according to the present invention.

[Second Embodiment, Refer to FIG. 3]

A second embodiment is an improved one of the first embodiment, wherein a pair of ejection rollers 52 is further provided after the image sensor 51 in the image reading unit 50. The installation of the ejection rollers 52 improves the reliability of transporting an original sheet for ensuring the complete scanning of the original image from the leading end through the trailing end. The driving mechanisms of the ejection rollers 52 should comprise an idle gear or an idle roller 53 disposed between the ejection rollers 52 and the ejection rollers 46 of the printer 1.

The other mechanisms are the same as those of the first embodiment.

Figure 4:
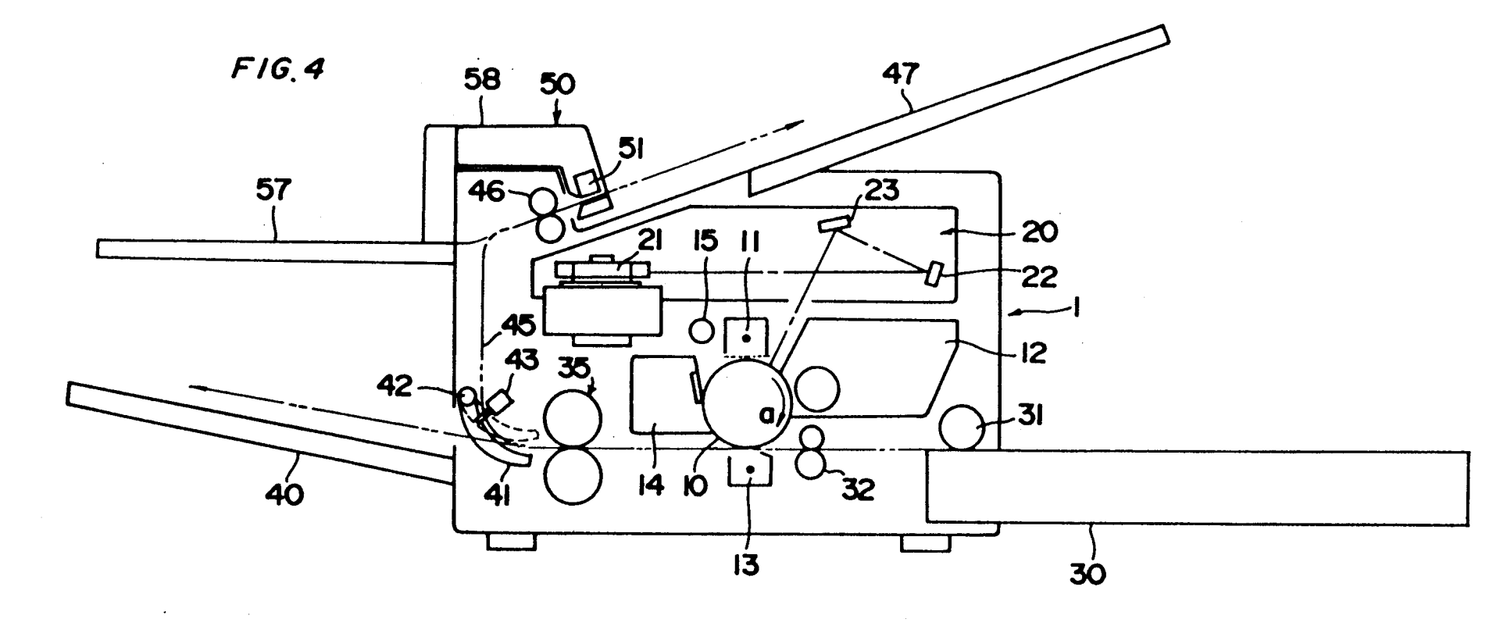
FIG. 4 is a schematic view showing an internal whole constitution of a printer which is a third embodiment according to the present invention.

[Third Embodiment, Refer to FIG. 4]

A third embodiment has an original insertion shelf 57 integratedly fixed to the casing 58 of the image reading unit 50. The original insertion shelf 57 is used only when the unit 50 is mounted on the printer 1, and therefore it is integratedly fixed to the unit casing. With this arrangement, the original insertion shelf can be dimensionally large, while the printer body needs only an original insertion path.

The other mechanisms are the same as those of the first embodiment.

Figure 5:
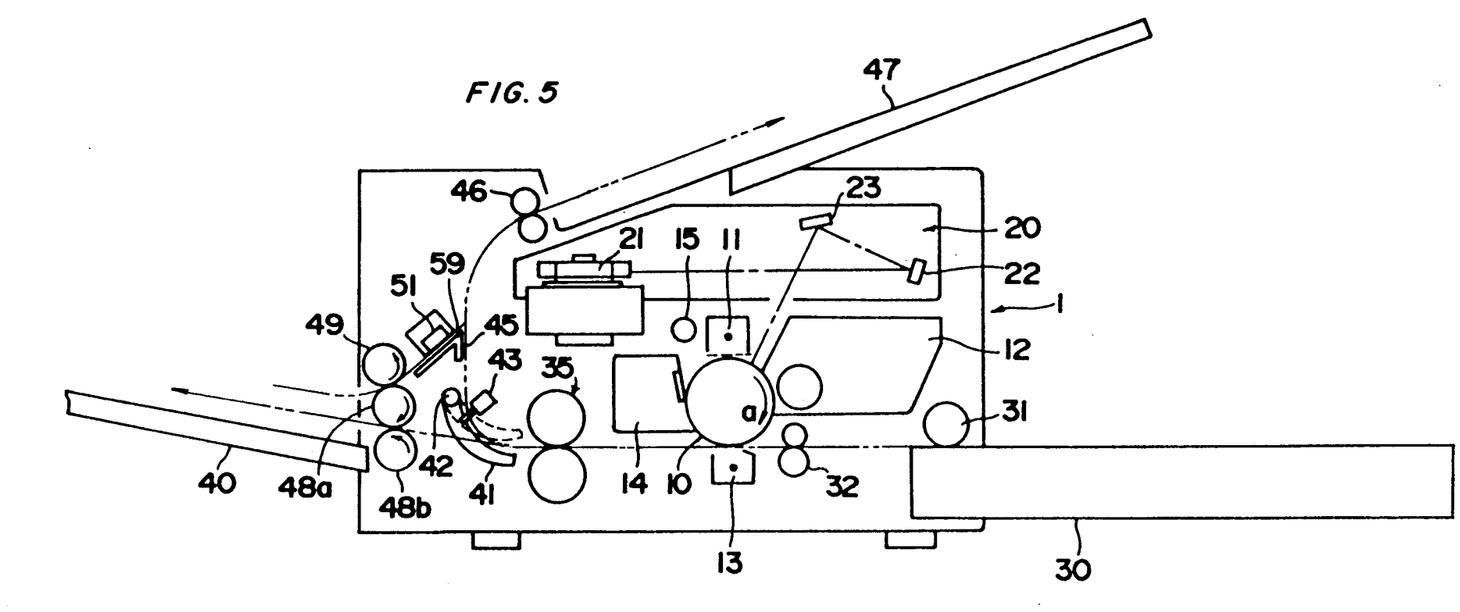
FIG. 5 is a schematic view showing an internal whole constitution of a printer which is a fourth embodiment according to the present invention.

[Fourth Embodiment, Refer to FIG. 5]

A fourth embodiment has the face-up tray 40 which can be used as an original insertion shelf, wherein a pair of rollers 48a and 48b as well as an insertion roller 49 which rotates dependently on the roller 48a are provided at the sheet ejection portion so as to allow an original inserted from the rollers 48a and 49 to be guided toward the reverse ejection path 45. The image sensor 51 is disposed between the couple of rollers 48a and 49 and the junction with the reverse ejection path 45 was facing a guide plate 59.

The other mechanisms are the same as those of the first embodiment.

Figure 6:
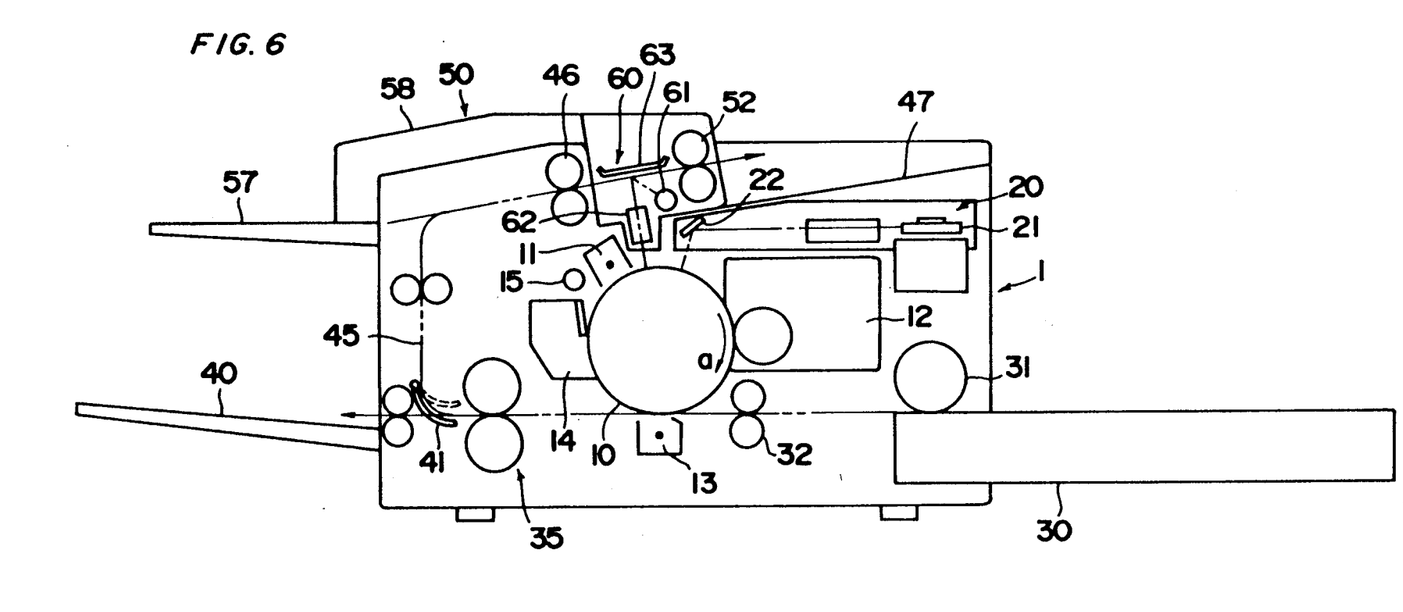
FIG. 6 is a schematic view showing an internal whole constitution of a Printer which is a fifth embodiment according to the present invention.

[Fifth Embodiment, Refer to FIG. 6]

A fifth embodiment has an image reading unit 50 employing an electrophotographic exposure device 60. The exposure device 60 comprises an exposure lamp 61, a lens array 62, and a guide plate 63. An original is inserted from the insertion plate 57 integratedly mounted to the casing 58 into the back portion of the reverse ejection path 45, and then transported by the rollers 46 and 52 to be ejected onto the face-down tray 47. Light is emitted from the exposure lamp 61 onto the original passing along the guide plate 63, and then the light reflected on the original is projected onto the photosensitive drum 10 through the lens array 62. The thus-formed electrostatic latent image is developed by the developing device 12 to a toner image, and then transferred onto a sheet fed from the cassette 30. In this case, the sheet diverter 41 is switched to the dotted position to eject the sheet onto the face-up tray 40.

The fifth embodiment also comprises the laser beam optical system 20, etc., for ensuring the functions of the printer, and the construction thereof is the same as the aforesaid embodiments.

[Other Embodiments]

Although the present invention has been described in connection with the preferred embodiments thereof, it is to be noted that various changes and modifications are apparent to those who are skilled in the art. Such changes and modifications are to be understood as included within the scope of the present invention as defined by the appended claims, unless they depart therefrom.

It should be noted that the sensor 51 can be any solid state photosensitive pickup device other than aforesaid CCD. Although the edition device including the bit map memory is provided independently of the printer in the data processing system as illustrated in FIG. 2, it may also be integrated in the printer.

What is claimed is:

1. An image forming apparatus comprising:
a copy sheet path connecting a copy sheet supplying section with a common receiving section, along which a copy sheet fed from the copy sheet supplying section is transported to the common receiving section;
means disposed at an image forming section for forming an image on the copy sheet which is traveling toward the common receiving section along the copy sheet path;
an original insertion port from which an original is inserted;
an original path connecting the original insertion port with the copy sheet path, along which the original inserted from the original insertion port is fed into the copy sheet path, whose junction with the copy sheet path is located between the image forming section and the common receiving section; and
means for reading an image on the original inserted from the original insertion port,
wherein the original whose image was read by the image reading means is transported through the copy sheet path to the common receiving section.

2. An image forming apparatus as claimed in claim 1, wherein the image forming means has a photosensitive member, a device for forming an electrostatic latent image on the photosensitive member, a device for developing the electrostatic latent image into a toner image, a device for transferring the tone image onto a copy sheet and a device for fixing the transferred toner image on the copy sheet, and the transferring device and the fixing device are disposed along the copy sheet path in order.

3. An image forming apparatus as claimed in claim 2, wherein the junction of the original path and the copy sheet path is located at a downstream of the fixing device.

4. An image forming apparatus as claimed in claim 3, wherein the image reading means is disposed between the original insertion port and the junction.

5. An image forming apparatus as claimed in claim 3, wherein the image reading means is disposed between the junction and the common receiving section.

6. An image forming apparatus as claimed in claim 5, wherein the image reading means is detachable from the body of the apparatus.

7. An image forming apparatus as claimed in claim 6, wherein an ejection roller is disposed at a place where the copy sheet path reaches the common receiving section, and the image reading means is detachably fitted between the ejection roller and the common receiving section.

8. An image forming apparatus as claimed in claim 7, wherein the image reading means has an image reading element and an ejection roller for ejecting the original whose image was read by the image reading element to the common receiving section.

9. An image forming apparatus as claimed in claim 3, wherein an original tray for holding an original is provided at the original insertion port.

10. An image forming apparatus as claimed in claim 3, wherein a copy sheet fed into the copy sheet path from the copy sheet supplying section is formed an image on a first side and ejected to the common receiving section with the first side down, the original inserted from the original insertion port is ejected to the common receiving section with it first side having an image up.

11. An image forming apparatus comprising:
means for forming an image on a copy sheet;
a copy sheet path connecting a copy sheet supplying section with a receiver section, along which a copy sheet fed from the copy sheet supplying section is transported to the receiving section via the image forming means, the copy sheet being ejected to the receiving section with its printed side down;
an original insertion port from which an original is inserted with its first side having an image up;
an original path connecting the original insertion port with the copy sheet path, along which the original inserted from the original insertion port is fed into the copy sheet path, whose junction with the copy sheet path is located between the image forming section and the receiving section; and
means for reading the image on the first side of the original inserted from the original insertion port, which is disposed between the junction of the original path and the copy sheet path and the receiving section,
wherein the original whose image on the first side was read by the image reading means is ejected to the receiving section.

12. An image forming apparatus as claimed in claim 11 further comprising:
a second receiving section;
a second copy sheet path diverging from the copy sheet path toward the second receiving section at a point between the image forming section and the junction with original path, from which a copy sheet is ejected to the second receiving section with its printed side up; and
switch means disposed at the diverging point for guiding a copy sheet which is formed an image selectively to the copy sheet path or the second copy sheet path.

13. An image forming apparatus as claimed in claim 12, wherein the image forming means forms an image on a copy sheet based on image data read by the image reading means.

14. An image forming apparatus as claimed in claim 13, wherein while the image forming means forms an image based on the image data read by the image reading means, the switch means is set to guide a copy sheet into the second copy sheet path.

15. An image forming apparatus comprising:
means for forming an image on a copy sheet;
a copy sheet supplying section;
a first tray;
a first copy sheet path connecting the copy sheet supplying section with the first tray, along which a copy sheet fed from the copy sheet supplying section is transported to the first tray via the image forming means, the copy sheet being ejected to the first tray with its printed side up;
a second tray;
ejection means disposed at an entrance of the second tray, having a first roller which rotates in a first direction, a second roller which is in contact with the first roller and rotates in a second direction, and a third roller which is in contact with the second roller and rotates in the first direction;
a second copy sheet path diverging from the first copy sheet path toward the ejection means at a downstream of the image forming section, from which a copy sheet is ejected to the second tray with its printed side up through the nip of the first roller and the second roller;
switch means disposed at the diverging point for guiding a copy sheet which is formed an image selectively to the first copy sheet path or the second copy sheet path;
an original insertion port from which an original is inserted into the nip of the second roller and the third roller, the original being inserted with its first side having an image up;
an original path connecting the nip of the second and the third rollers with the first copy sheet path, whose junction with the first copy sheet path is located at a downstream of the diverging point; and
means for reading the image on the first side of the original fed into the original path from the original insertion port through the nip of the second and the third rollers,
wherein the original whose image on the first side was read by the image reading means is ejected to the first tray through the first copy sheet path with the first side up.

16. An image forming apparatus comprising:
a photosensitive member;
a first latent image forming means for forming an electrostatic latent image on the photosensitive member based on digital image data;
means for developing the electrostatic latent image on the photosensitive member into a toner image;
means for transferring the toner image on the photosensitive member onto a copy sheet;
means for fixing the transferred toner image on the copy sheet;
a copy sheet path connecting a copy sheet supplying section with a common receiving section, along which a copy sheet fed from the copy sheet supplying section to the common receiving section via the transferring means the fixing means;
an original insertion port from which an original is inserted;
an original path connecting the original insertion port with the copy sheet path, along which the original inserted from the original insertion port is fed into the copy sheet path, whose junction with the copy sheet is located between the fixing means and the common receiving section; and
second latent image forming means disposed between the junction of the original path and the copy sheet path and the common receiving section for forming an electrostatic latent image by optically projecting an image of the original inserted from the original insertion port onto the photosensitive member,
wherein after an image forming operation of the second latent image forming means, the original which was subjected to the operation is ejected to the common receiving section.

17. An image forming apparatus as claimed in claim 16, wherein the second latent image forming means has an exposure device for exposing the original which is traveling toward the receiving section from the junction to light, and a projection lens for projecting the exposed image of the original onto the photosensitive member.

18. An image forming apparatus comprising:
means for forming an image on a copy sheet;

means for feeding a copy sheet to the image forming means;

a tray for receiving a copy sheet on which an image is formed by the image forming means;

a copy sheet path connecting the feeding means with the tray, along which a copy sheet is transported from the feeding means to the tray via the image forming means;

image reading means installed in the copy sheet path, which is detachable therefrom;

an original insertion port from which an original is inserted; and an original path connecting the original insertion port with the tray, along which the original inserted from the original insertion port is transported to the tray via the image reading means, a part of which is also used as the copy sheet path.

19. An image forming apparatus as claimed in claim 18, wherein the original path is confluent with the copy sheet path at a downstream of the image forming means.

20. In an image forming apparatus for forming a toner image on a copy sheet and fixing the toner image on the copy sheet while the copy sheet is transported toward a tray along a copy sheet path, a method comprising the steps of:

setting image reading means to a specified position between fixing means and the tray;

inserting an original into the copy sheet path at a place which is a downstream of the fixing means and an upstream of the specified position;

reading an image of an original traveling along the copy sheet path by the image reading means; and ejecting the original whose image was read by the image reading means to the tray.

21. A method as claimed in claim 20, which further comprising the steps of:

setting sub-tray;

forming a toner image on a copy sheet corresponding to the image read by the image reading means; and ejecting the copy sheet to the sub-tray.

* * * * *

UNITED STATES PATENT AND TRADEMARK OFFICE
CERTIFICATE OF CORRECTION

PATENT NO. : 5,028,957
DATED : July 2, 1991
INVENTOR(S) : Masashi SAKAMOTO

It is certified that error appears in the above-identified patent and that said Letters Patent is hereby corrected as shown below:

```
column 8, line 41 (claim 16, line 16):
    insert --and-- between "means" and "the";

column 8, line 48 (claim 16, line 23):
    insert --path-- between "sheet" and "is"; and column 10, line 17 (claim 21, line 3):
    insert --a-- between "setting" and "sub-tray"
```

Signed and Sealed this

Sixteenth Day of March, 1993

Attest:

STEPHEN G. KUNIN

Attesting Officer     Acting Commissioner of Patents and Trademarks